(12) United States Patent
Babka et al.

(10) Patent No.: US 7,206,808 B2
(45) Date of Patent: Apr. 17, 2007

(54) SYSTEM AND METHOD FOR MANAGING DIVERSE VIDEO NETWORK DEVICES VIA APPLICATION AND INTERFACE OBJECTS

(75) Inventors: James Joseph Babka, Round Rock, TX (US); Kurtis L Seebaldt, Round Rock, TX (US)

(73) Assignee: Tandberg Telecom AS, Lysaker (NO)

( * ) Notice: Subject to any disclaimer, the term of this patent is extended or adjusted under 35 U.S.C. 154(b) by 636 days.

(21) Appl. No.: 09/919,538

(22) Filed: Jul. 31, 2001

(65) Prior Publication Data

US 2003/0028679 A1    Feb. 6, 2003

(51) Int. Cl.
*G06F 15/16* (2006.01)

(52) U.S. Cl. ............................. 709/204; 719/321

(58) Field of Classification Search ........ 719/321–323, 719/327, 328, 310, 316; 718/100; 725/116, 725/147; 709/204–207, 224–226
See application file for complete search history.

(56) References Cited

U.S. PATENT DOCUMENTS

| 5,903,894 | A | | 5/1999 | Reneris ..................... 707/100 |
|---|---|---|---|---|
| 5,999,966 | A | * | 12/1999 | McDougall et al. ........ 709/204 |
| 6,020,881 | A | | 2/2000 | Naughton et al. .......... 345/327 |
| 6,078,942 | A | * | 6/2000 | Eisler et al. ................ 718/100 |
| 6,085,236 | A | | 7/2000 | Lea ............................ 709/220 |
| 6,272,127 | B1 | * | 8/2001 | Golden et al. .............. 370/352 |
| 6,353,862 | B1 | * | 3/2002 | Hamilton .................... 719/323 |
| 6,389,487 | B1 | * | 5/2002 | Grooters ...................... 710/51 |
| 6,507,953 | B1 | * | 1/2003 | Horlander et al. .......... 725/105 |
| 6,633,324 | B2 | * | 10/2003 | Stephens, Jr. ............ 348/14.09 |
| 6,909,708 | B1 | * | 6/2005 | Krishnaswamy et al. ... 370/352 |

OTHER PUBLICATIONS

International Search Report PCT/US02/23768, mailed Nov. 27, 2002.

* cited by examiner

*Primary Examiner*—Van Nguyen
(74) *Attorney, Agent, or Firm*—Oblon, Spivak, McClelland, Maier & Neustadt, P.C.

(57) ABSTRACT

A video network platform manages video network devices with management applications, such as scheduling, monitoring and diagnostics applications, by representing the devices as interface objects that support a network interface module, and application objects used by the management applications and created by an adapter engine that creates an application object for each corresponding video network device interface object. A network interface module associated with the video network platform invokes the adapter engine to create an application object associated with a device. The application object uses its dynamic attribute query capabilities to build an interface object in the network interface module and thus obtain device attributes such as device address information. The application module populates itself with device information for supporting management applications, thus allowing conventional network interface modules to cooperate with application specific objects.

17 Claims, 2 Drawing Sheets

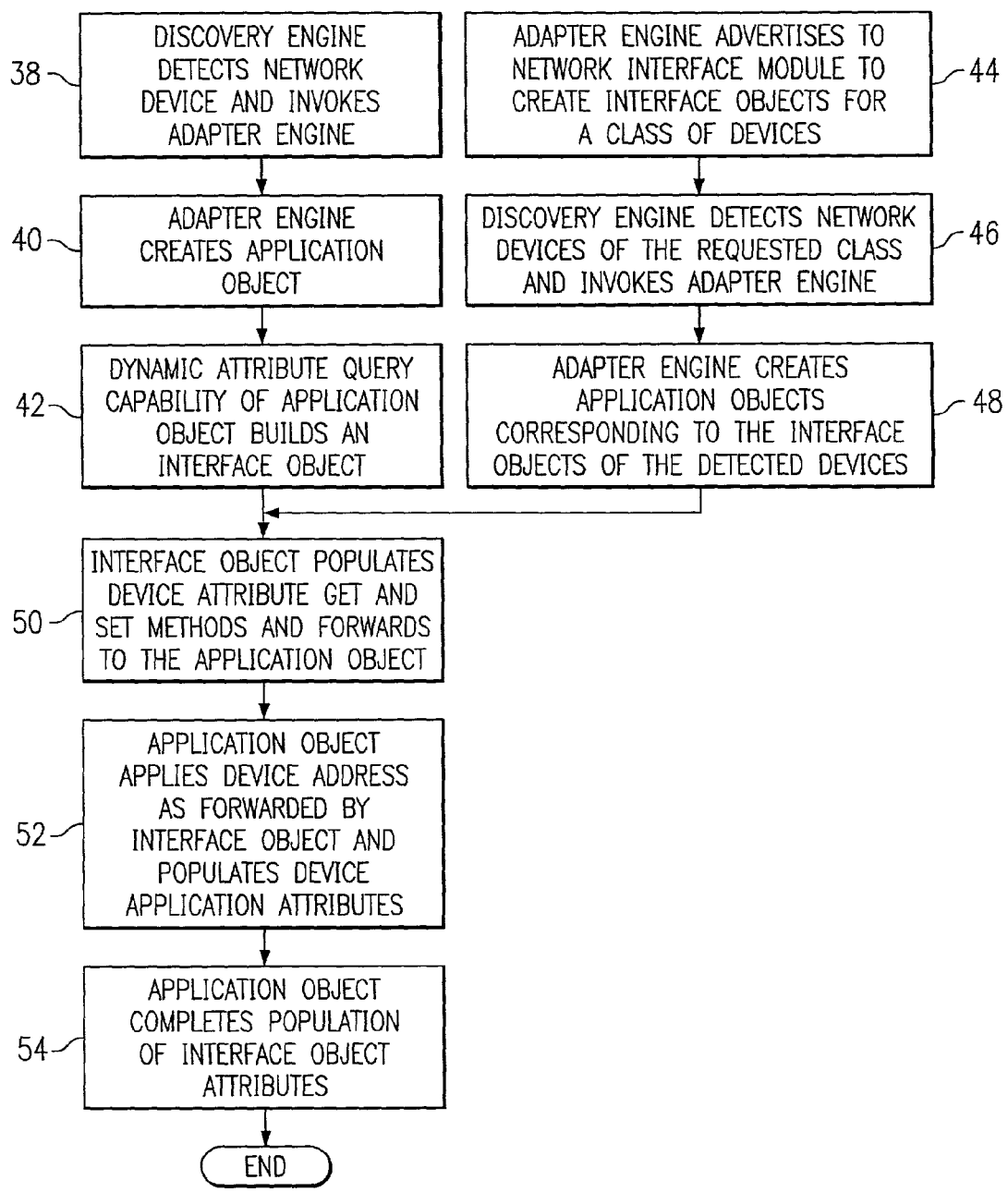

SYSTEM AND METHOD FOR MANAGING DIVERSE VIDEO NETWORK DEVICES VIA APPLICATION AND INTERFACE OBJECTS

TECHNICAL FIELD

This invention relates generally to video network communications, and more specifically relates to a system and method for managing video network devices.

BACKGROUND OF THE INVENTION

Video conference calls have grown in popularity as the expense of video conferencing devices has decreased and the availability of broadband communication networks has increased. Businesses often prefer the more personal communication available through video conferences compared with telephone conferences, and also enjoy savings in travel costs while still having a personal presence among the participants that is not possible with audio only communications. The increased popularity of video conferencing has resulted in the deployment of video network devices in wide ranging disparate locations with the devices interfaced by business networks or the public network. Often, video calls involve the interfacing of video network devices manufactured by a variety of different manufacturers and using a variety of protocols and network communication interfaces.

As video network devices grow in number, the task of scheduling, monitoring and diagnosing problems of the devices grows in complexity. For instance, a single video network might interface with video end points, multi-call units (MCUs), and gateways each manufactured by different manufacturers and using different communication protocols. Each of these devices may include specific management, maintenance and monitoring needs that makes central management of a network difficult to accomplish.

One difficulty with management of video devices is establishing a uniform representation of the devices for use by management applications. Without a uniform means of communicating with different types of devices, management applications generally must be updated as devices on the video network are changed or reconfigured. Thus, video network operational staff is typically faced with a complex task of maintaining video networks by tracking changes to the network and updating management applications and devices on an individual basis. This increases the cost and complexity of video networks and also results in reduced reliability.

SUMMARY OF THE INVENTION

Therefore a need has arisen for a system and method which manages video network devices through a centralized video network platform.

A further need has arisen for a system and method which provides a uniform representation of different types of video network devices to reduce the complexity of managing the different types of video network devices with management applications.

In accordance with the present invention, a system and method are provided which substantially reduce the problems and disadvantages of managing video network devices. A video network platform includes a network interface operable to represent video devices as interface objects. An adapter engine associated with the network interface creates application objects for video devices that correspond with the interface objects. Management applications use the application objects to manage the video devices from the video network platform.

More specifically, a network interface module provides a uniform communication interface for the video network platform to communicate with the video network, such as the WebNMS interface commercially available from AdventNet for interfacing servers with internet networks. The network interface module represents devices of the network as interface objects, such as the managed objects of WebNMS, with attribute get and set methods that are generic in nature and that provide access to device attributes as sets of name value pairs. A discovery engine associated with the network interface module interrogates devices on the network to allow creation of interface objects with appropriate attributes when a device is added to or changed on the network.

An adapter engine communicates with the network interface module and is called when the video network platform seeks to represent a device on the video network. For instance, a network operator who adds a device to the video network may initiate a call to the adapter engine, or the discovery engine may initiate a call to the adapter engine if a new device is detected on the network. The adapter engine creates an application object and invokes the network interface module to create a corresponding interface object. The network interface module interrogates the device and populates the interface object with appropriate attributes. The adapter engine applies the interface object attributes to the corresponding application object and the application object is then able to directly interrogate the device to populate attributes of the application object. For instance, the interface object is populated with attributes to identify the address and device type. These interface object attributes are forwarded to the application object to allow a direct interface for the application object to obtain desired attributes.

Management applications associated with the video network platform perform management functions using the application object representations of devices. In some instances, management application queries to the network interface module for interface objects that represent video devices are intercepted by a special kind of interface object known as an override interface object. The override interface object takes interface object requests and forwards them to an application object that corresponds with the requested interface object. Override interface objects enable additional functionality for existing management applications that use interface objects to communicate with devices. An override interface object references to a corresponding application object which in turn enables additional functionality otherwise not available through an interface object. Thus, existing management applications that use interface objects are easily adapted to use application objects by re-directing requests with an override interface object.

The present invention provides a number of important technical advantages. One important technical advantage is that the video network platform allows centralized management of video devices of different types. Management applications for performing such functions as scheduling, diagnostics and monitoring of video network devices access the application object to perform the management function. Application objects that are independent from the interface objects provide greater flexibility for the use of standardized network interfaces to reduce cost and complexity with application objects available to provide information for specific functionality.

Another important technical advantage of the present invention is that the video network platform is flexible to adapt for managing different types of network devices and new management applications without substantially rearchitecting the interface between the video network platform and the network devices. The adapter engine creates application objects with needed attributes for a given application without affecting the video network platform's interface with the network devices. Instead, the application objects are modified to handle necessary attributes independent of the interface objects and the override object directs queries from management applications for interface objects to the application objects with the desired attributes.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 depicts a flow diagram of a process for creating and populating application objects.

DETAILED DESCRIPTION OF THE INVENTION

Preferred embodiments of the present invention are illustrated in the figures, like numerals being used to refer to like and corresponding parts of the various drawings.

Management of video network devices from a central video network platform offers the advantage of applying applications for scheduling, diagnostics, and monitoring of the devices even if the devices are of different types. Conventional network management systems, such as WebNMS from AdventNet, provide a suitable interface for a video network platform with an internet architecture to allow management communication between applications and video devices. However, conventional network interface modules like WebNMS represent network devices as managed objects that are generic in nature. These managed objects provide good interface objects for a wide range of network devices but due to the proprietary nature of the network interface module they lack the flexibility for adapting to specific devices and applications without access to the source code of the network interface module.

One standard for management of devices in Java, called JMX, defines Management Beans, or Mbeans, to represent devices for management. The JMX standard provides a variety of functions to operate on Mbeans and are thus more flexible as application objects for management applications to manage network devices. The Mbeans encapsulate operational attributes of the devices for the management applications to access and use. Thus, Mbeans offer advantages as application objects over the use of managed objects created to act as interface objects by a network interface module such as WebNMS.

Figure 1:
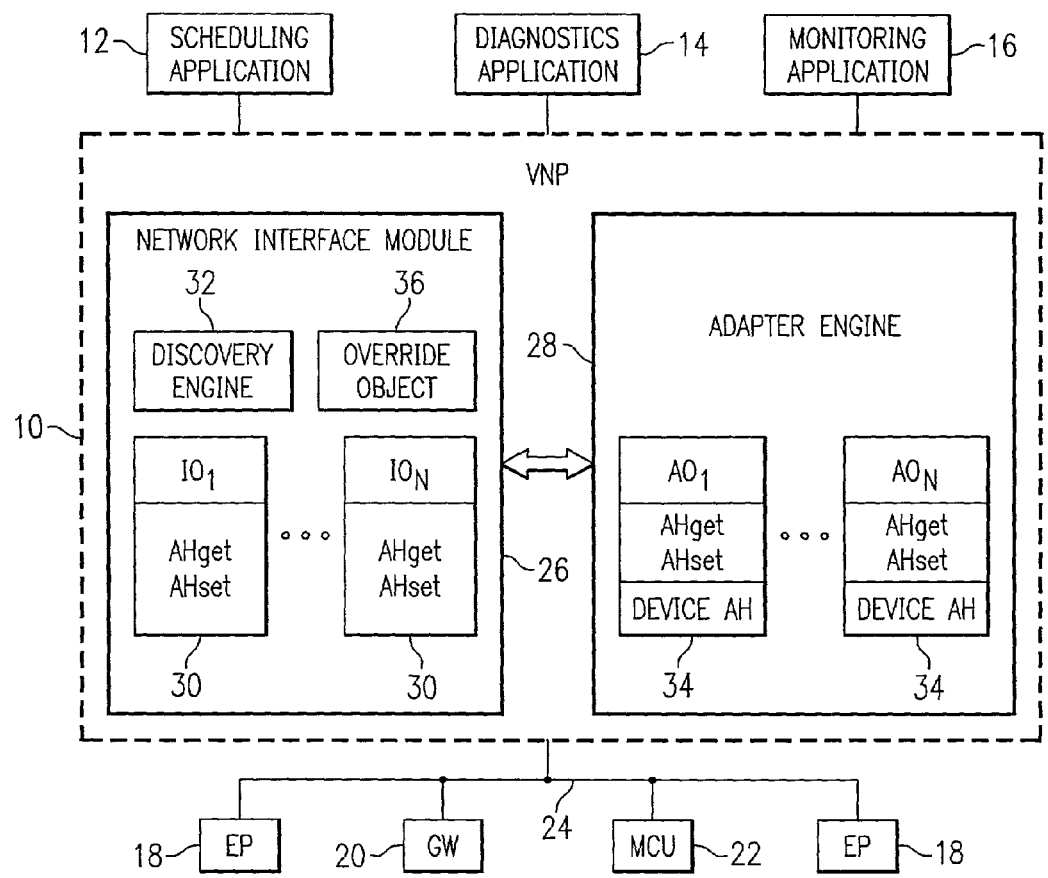
FIG. 1 depicts a block diagram of a video network platform interfaced with a video call network.

To take advantage of the cost savings and simplicity of a conventional network interface module as well as the flexibility of application specific object standards, the present invention "hijacks" interface objects and creates corresponding application objects for managing devices with management applications. Referring now to FIG. 1, a video network platform 10 provides an interface between management applications, including scheduling application 12, diagnostics application 14 and monitoring application 16, and network devices, including end point 18, gateway 20 and MCU 22. Video network platform 10 communicates with management applications and video network devices through a network 24, such as the internet or another TCP/IP based network.

Video network platform 10 supports a network interface module 26 and an adapter engine 28. Network interface module 26 is a commercially available network management system, such as Web NMS, which manages network devices as represented by interface objects 30. In the example of Web NMS, interface objects 30 are called "managed objects" and have generic get properties and set properties methods that provide access to device attributes as sets of name/value pairs. Network interface module 26 includes a discovery engine 32 which is operable to detect network devices and create interface objects with appropriate attributes.

Adapter engine 28 communicates with network interface module 26 to ensure that network devices represented by interface objects are also represented by a corresponding application object 34, such as a Mbean. For instance, if discovery engine 32 detects a new network device or an operator adds a network device, then a request is sent to adapter engine 28 to create a new application object corresponding to the new device. The adapter engine 28 then uses the dynamic attribute query capabilities of the application object to build an interface object corresponding to the device in the network interface module 26. For instance, the application object populates an existing shell interface object, such as an interface object created by the discovery engine, with information. Alternatively, the adapter engine may initiate creation of a corresponding interface object. The new interface object 30 obtains basic information that is available via attribute get and set methods from the device, such as the device address and class type, and this information is then forwarded to the corresponding application object. Once the application object 34 has the interface object attributes, application object 34 then is able to obtain detailed device attributes directly from the device. This method of creating the corresponding application and interface objects ensures a reference to each other.

Once the application object is populated with the device attributes, new management applications can access the application objects to manage the network devices, while existing management applications can access application objects through corresponding override interface objects. If a request comes to an interface object from an existing application that uses interface objects, then the interface object acts as an override interface object 36 by accepting the request and overriding the methods of the requested interface object to determine whether a corresponding application object should be used instead. The override interface object 36 takes the attribute names of the request and invokes the appropriate method on the corresponding application object 34 to determine if the application object supports the requested attribute. If the application object supports the requested attribute, it invokes the appropriate method on the device to perform the gets or sets. If not, then override interface object 36 provides the attributes via the existing interface object mechanisms.

Referring now to FIG. 2, a flow diagram depicts a process for creating application objects and interface objects to support devices of a video network. At step 38, the discovery engine detects the network device interfaced with the network and invokes the adapter engine. At step 40, the adapter engine creates an application object corresponding to the detected device. At step 42, the adapter engine uses the dynamic attribute query capability of the created application object to build an interface object in the network interface module.

In some instances, a network operator may desire to input a new device manually through the adapter engine. At step 44, the adapter engine advertises the new device to the network interface module and the network interface module creates an interface object for the class of devices. At step 46, the discovery engine detects network devices of the requested class and invokes the adapter engine if devices are detected. At step 48, the adapter engine creates application objects corresponding to the interface objects of the detected devices.

Once the device or devices are detected, the interface object populates the device attribute get and set methods and forwards this information to the application object. Included in the information forwarded to the application object is the address of the device or devices so that the application object can directly contact and communicate with the device. At step 52, the application object applies the device address as forwarded by the interface object and populates the device application attributes with the detailed device information needed for management of the device by the management applications. Because the application objects are flexible and accessible for programming, the set of attributes for the devices is flexible to allow management of the devices as appropriate. Further, different types of devices with different types of information are easily represented for use by management applications.

At step 54, the application object completes population of the interface object attributes as needed. Since the application object is flexible and capable of defining attributes for specific applications and devices, it will act as the primary reference for management applications to manage devices.

In some instances, requests for device management may come as requests to interface objects. For instance, network 24 may include non-video devices such as routers that are managed through interface objects. In these cases, no override interface object functionality is used, but instead the existing interface objects defined for those devices are used.

Figure 3:
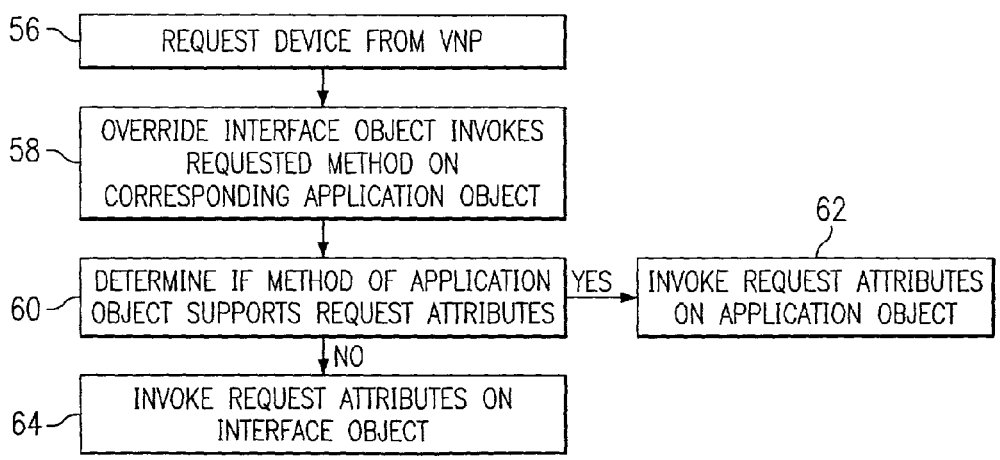
FIG. 3 depicts a flow diagram for a process of interfacing a management application with a video network platform.

Referring now to FIG. 3, a flow diagram depicts the process by which an override interface object forwards video network device requests to the corresponding application object. At step 56, a request is received at the video network platform for the device as an interface object. At step 58, the override interface object invokes the requested method on the corresponding application object if one exists. At step 60, a determination is made of whether the method of the application object supports the requested attributes. If the method supports the requested attributes, then at step 62 the override interface object invokes the request attributes on the corresponding application object. If the method does not support the requested attributes, then at step 64, the override interface object invokes the requested attributes on the interface object. In this manner, requests appropriately addressed to an interface object are processed by the network interface module.

Although the present invention has been described in detail, it should be understood that various changes, substitutions and alterations can be made hereto without departing from the spirit and scope of the invention as defined by the appending claims.

What is claimed is:

1. A video conference network platform for managing at least two video conference network devices each having unique operational attributes, the video conference network platform comprising:
   a video conference network interface module operable to interface with the at least two video conference network devices and to represent of the at least two video conference network devices as corresponding interface objects;
   an adapter engine associated with the video conference network interface module and operable to create a corresponding application object for each of said at least two video conference network devices, each application object corresponding to a respective interface object and having a common format, each application object including operational attributes obtained via an interrogation of the respective video conference device by the adapter engine;
   one or more management applications operable to manage the at least two video conference network devices via their respective application and interface objects; and
   a discovery engine associated with the video conference network interface, the discovery engine operable to detect each of the at least two video conference network devices and initiate creation of an object to represent each detected video conference network device;
   wherein the discovery engine initiates creation of an application object by the adapter engine, the adapter engine further operable to initiate creation of a corresponding interface object by the video conference network interface.

2. The video conference network platform of claim 1 further comprising:
   an override interface object associated with the video conference network interface, the override object operable to accept a request for an interface object and to direct the request to an application object corresponding to the interface object.

3. The video conference network platform of claim 1 wherein the adapter engine incorporates attributes of the interface object into the corresponding application object.

4. The video conference network platform of claim 1 wherein the interface object comprises a managed object.

5. The video conference network platform of claim 1 wherein the application object comprises a Management Bean.

6. The video conference network platform of claim 1 wherein the one or more management applications comprises a video conference scheduling application.

7. The video conference network platform of claim 1 wherein the one or more management applications comprises a video conference diagnostics application.

8. The video conference network platform of claim 1 wherein the one or more management applications comprises a video conference monitoring application.

9. A video conference system, comprising: at least one video conference end point; and the video conference network platform recited in claim 1.

10. A method of managing at least two video conference network devices each having unique operational attributes, the method comprising:
   interfacing a video conference network interface module with the at least two video conference network devices and representing the at least two video conference network devices as corresponding interface objects;

creating an application object for each of said at least two video conference network devices, each application object corresponding to a respective interface object and having a common format, each application object including operational attributes obtained via an interrogation of the respective video conference device;

managing the at least two video conference network devices via their respective application and interface objects by one or more management applications; and detecting each of the at least two video conference network devices with a discovery engine and initiating creation of an application object to represent each detected video conference network device;

wherein the step of initiating creation of an application object is followed by creation of the application object and initiating creation of a corresponding interface object.

11. The method of claim 10 further comprising:

accepting a request for an interface object and directing the request to an application object corresponding to the interface object.

12. The method of claim 10 further comprising incorporating, by an adapter engine, attributes of the interface object into the corresponding application object.

13. The method of claim 10 wherein the interface object comprises a managed object.

14. The method of claim 10 wherein the application object comprises a Management Bean.

15. The method of claim 10 wherein the one or more management applications comprises a video conference scheduling application.

16. The method of claim 10 wherein the one or more management applications comprises a video conference diagnostics application.

17. The method of claim 10 wherein the one or more management applications comprises a video conference monitoring application.

* * * * *